United States Patent
Croughwell

(10) Patent No.: US 12,022,797 B2
(45) Date of Patent: Jul. 2, 2024

(54) DEVICES MADE FROM RECYCLED PLASTIC FILLER MATERIAL

(71) Applicant: Charles Croughwell, Agua Dulce, CA (US)

(72) Inventor: Charles Croughwell, Agua Dulce, CA (US)

( * ) Notice: Subject to any disclaimer, the term of this patent is extended or adjusted under 35 U.S.C. 154(b) by 0 days.

(21) Appl. No.: 17/165,772

(22) Filed: Feb. 2, 2021

(65) Prior Publication Data

US 2021/0153451 A1    May 27, 2021

Related U.S. Application Data

(63) Continuation of application No. 15/046,445, filed on Feb. 17, 2016, now Pat. No. 10,925,253.

(60) Provisional application No. 62/117,444, filed on Feb. 17, 2015.

(51) Int. Cl.
*A63B 37/12* (2006.01)
*A01K 1/015* (2006.01)
*A01K 15/02* (2006.01)
*B29B 17/00* (2006.01)
*B29B 17/04* (2006.01)

(52) U.S. Cl.
CPC ............ *A01K 1/015* (2013.01); *A01K 15/025* (2013.01); *B29B 17/00* (2013.01); *B29B 17/04* (2013.01); *Y02W 30/62* (2015.05)

(58) Field of Classification Search
CPC .... A63B 69/203; A01K 1/015; A01K 15/025; B29B 17/00; B29B 17/04; Y02W 30/62
USPC ........................................................ 428/71
See application file for complete search history.

(56) References Cited

U.S. PATENT DOCUMENTS

2014/0342859 A1* 11/2014 Newman ................ A63B 45/00
473/607

* cited by examiner

*Primary Examiner* — Brent T O'Hern
(74) *Attorney, Agent, or Firm* — Richard B. Cates

(57) ABSTRACT

A medicine ball formed using a filler comprising shredded plastic particles formed from discarded plastic articles. The discarded plastic articles are ground up together without substantive sorting out of the articles by plastic type, color, etc.

12 Claims, 9 Drawing Sheets

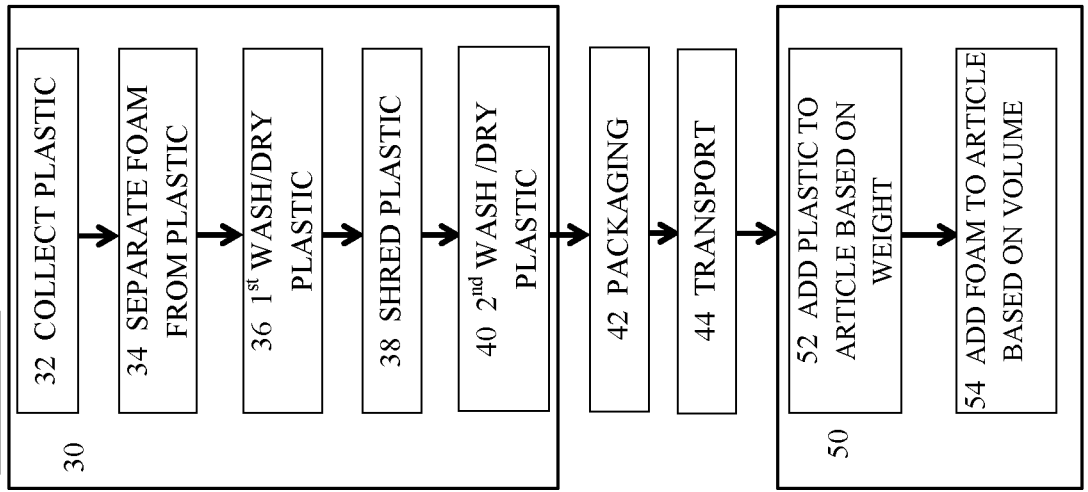
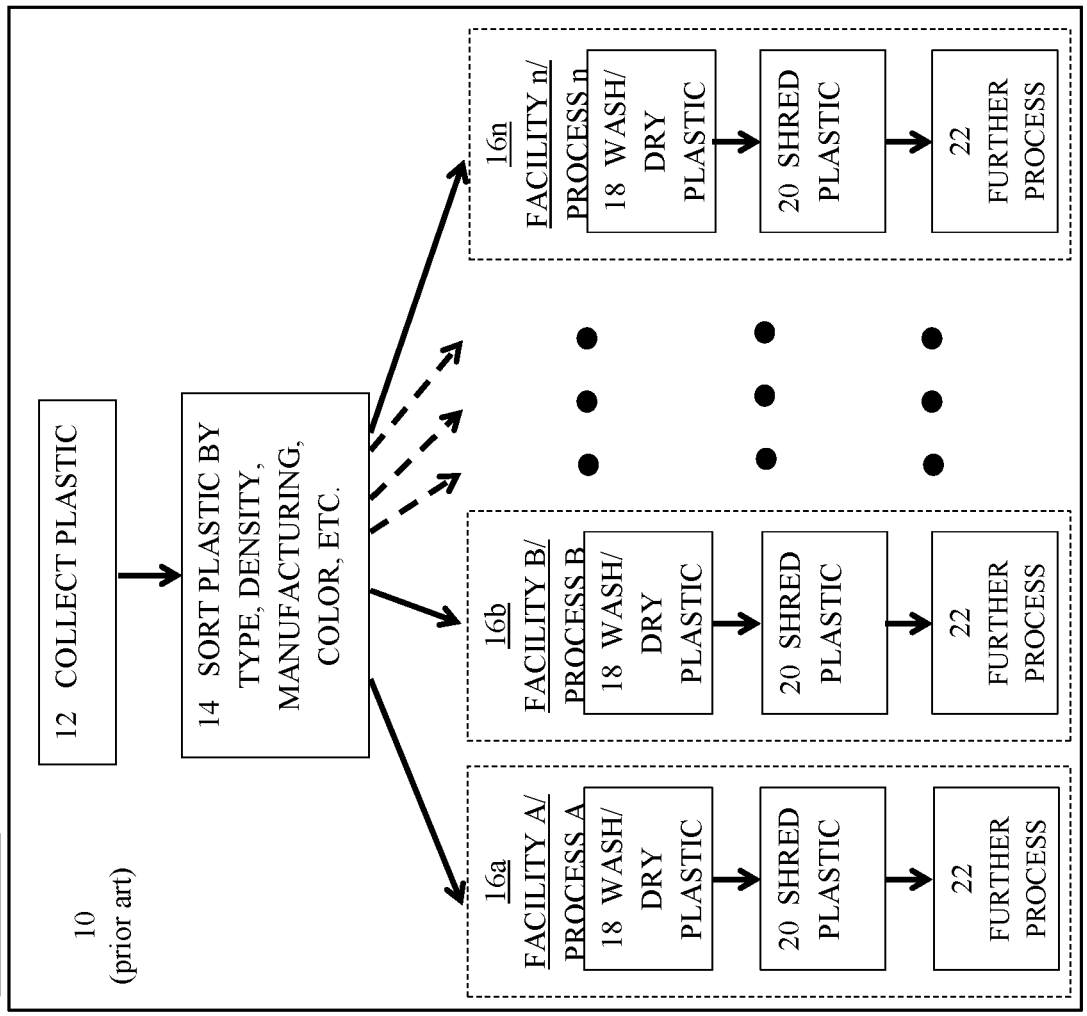

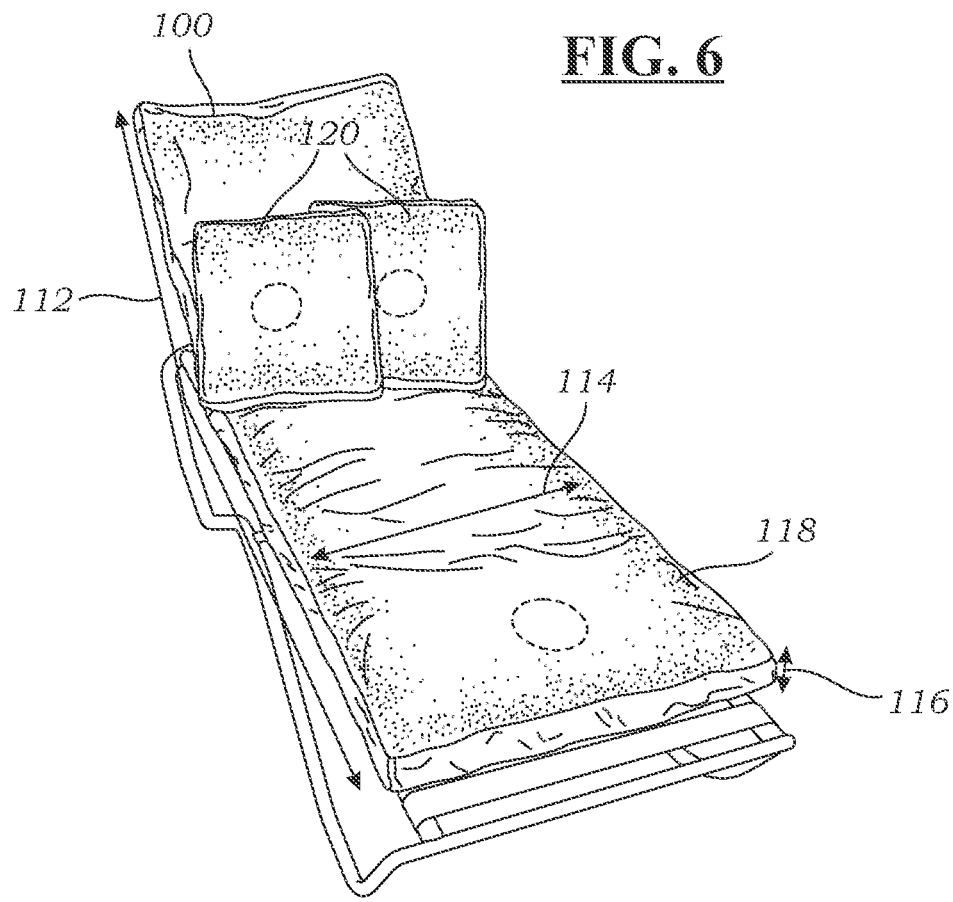
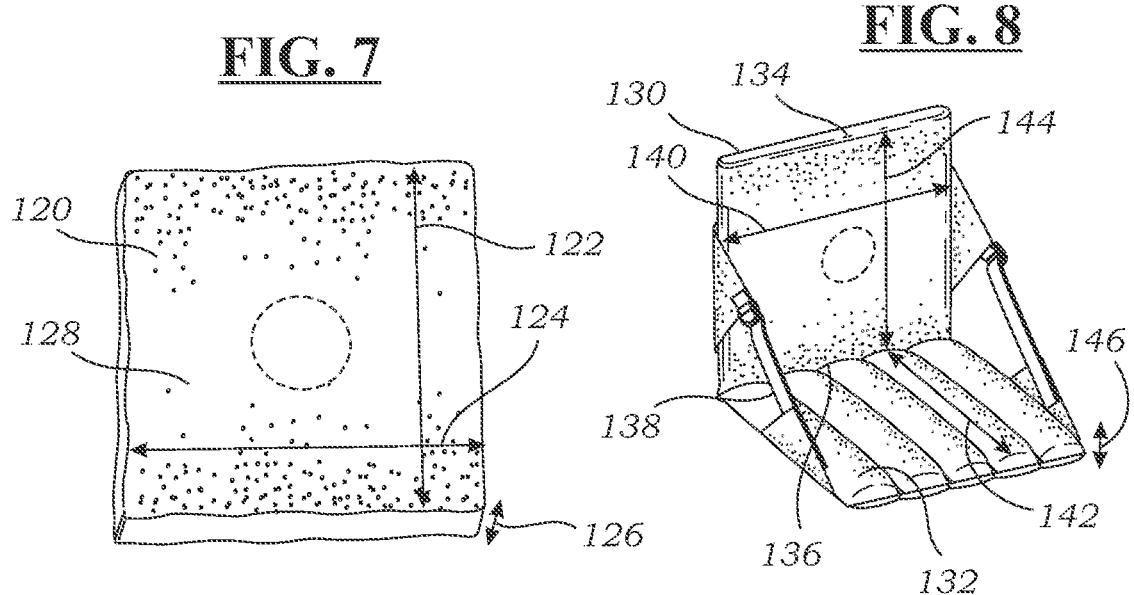

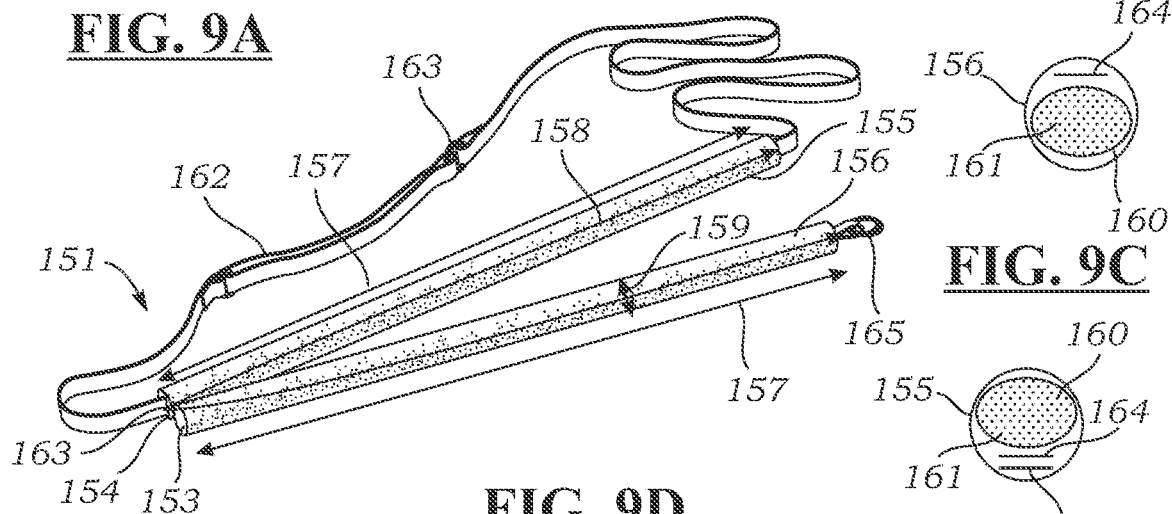
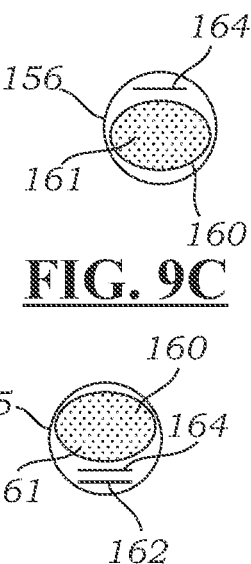
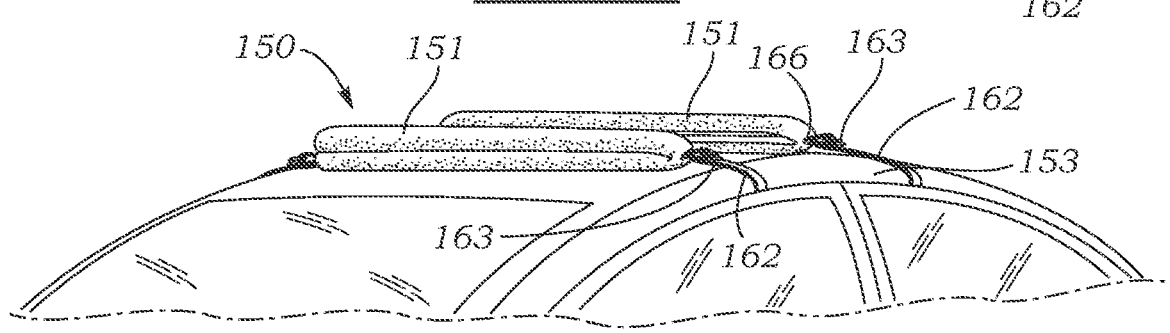
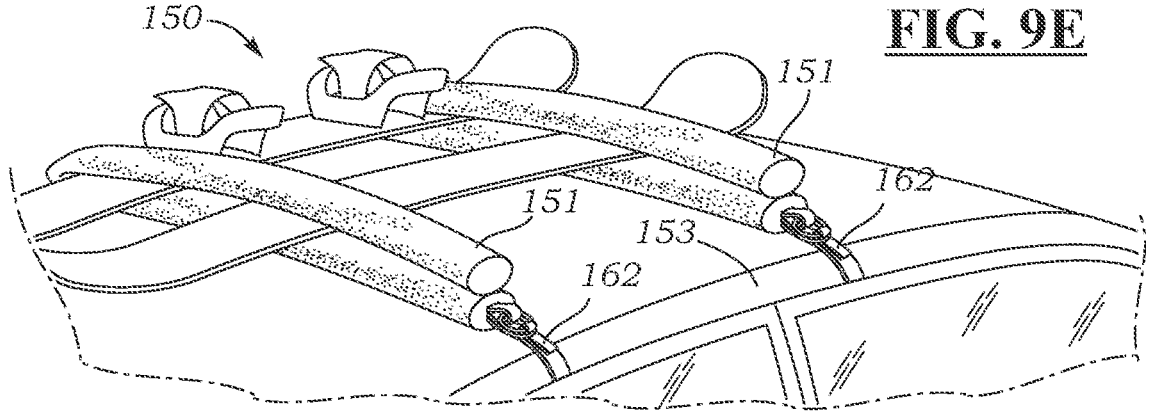
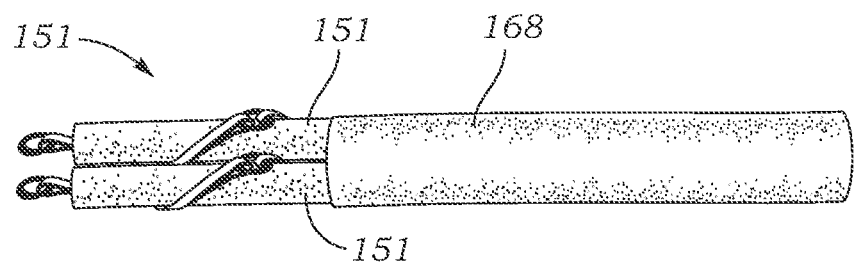

DEVICES MADE FROM RECYCLED PLASTIC FILLER MATERIAL

RELATED APPLICATIONS

The present application is a continuation of U.S. patent application Ser. No. 15/046,445, filed Feb. 17, 2016 and entitled "Filler Material, Method of Recycling Plastic, and Devices Made Therefrom,", which claims priority from U.S. Provisional Patent Application No. 62/117,444, filed Feb. 17, 2015 and entitled "Filler Material, Method of Recycling Plastic, and Devices Made Therefrom," the entire contents of each of which are hereby incorporated herein by reference.

FIELD OF THE INVENTION

The invention is a method for recycling plastic and manufacturing filler for sporting equipment and other goods, and fillers and devices manufacture according to the method.

BACKGROUND OF THE INVENTION

Plastic is one of the most versatile and useful materials. It can be formed into a numerous shapes in an almost endless variety of textures and colors. It can also be a substantial source of unwanted debris, on land and sea. Coastal areas can be particularly hard hit when currents bring debris from distant areas and deposit in into local waters and onto local beaches. Plastic debris that washes ashore on beaches throughout the world includes plastic bottles, bottle caps, fishing gear (line, nets, flotation devices), six-pack rings, ice chests, and children's toys. Marine plastic debris often washes ashore hundreds and even thousands of miles from where it first entered the water.

Recycling of plastic polymers can be challenging compared with recycling of other materials such as aluminum, glass, and paper. While gathering plastic debris and taking it to recycling centers can be straightforward, subsequent recycling steps are typically much more complex and costly than recycling of other materials such as glass or aluminum. As a general rule, different plastics cannot be mixed together in conventional recycling methods. Combining different types of plastic can render the resulting material useless for manufacturing. Most plastic recycling methods require careful sorting of the plastic debris by the type of plastic, color, etc. Such careful sorting, which requires much effort, is necessary because different plastics when melted together can phase-separate, like oil and water. The sorting is complicated because of the wide diversity of plastic types. Some common plastics are listed below:

Polyester (PES): Fibers, textiles.
Polyethylene terephthalate (PET): Carbonated drink bottles, peanut butter jars, plastic film, microwavable packaging.
Polyethylene (PE): Wide range of inexpensive uses including supermarket bags, plastic bottles.
High-density polyethylene (HDPE): Detergent bottles, milk jugs, and molded plastic cases.
Polyvinyl chloride (PVC): Plumbing pipes and guttering, shower curtains, window frames, flooring.
Polyvinylidene chloride (PVDC) (aka Saran): Food packaging.
Low-density polyethylene (LDPE): Outdoor furniture, siding, floor tiles, shower curtains, clamshell packaging.
Polypropylene (PP): Bottle caps, drinking straws, yogurt containers, appliances, car fenders (bumpers), plastic pressure pipe systems.
Polystyrene (PS): Packaging foam/"peanuts", food containers, plastic tableware, disposable cups, plates, cutlery, CD and cassette boxes.
High impact polystyrene (HIPS): Refrigerator liners, food packaging, vending cups.
Polyamides (PA) (Nylons): Fibers, toothbrush bristles, tubing, fishing line, low strength machine parts: under-the-hood car engine parts or gun frames.
Acrylonitrile butadiene styrene (ABS): Electronic equipment cases (e.g., computer monitors, printers, keyboards), drainage pipe.
Polyethylene/Acrylonitrile Butadiene Styrene (PE/ABS): A slippery blend of PE and ABS used in low-duty dry bearings.
Polycarbonate (PC): Compact discs, eyeglasses, riot shields, security windows, traffic lights, lenses.
Polycarbonate/Acrylonitrile Butadiene Styrene (PC/ABS): A blend of PC and ABS that creates a stronger plastic. Used in car interior and exterior parts, and mobile phone bodies.
Polyurethanes (PU): Cushioning foams, thermal insulation foams, surface coatings, printing rollers (Currently 6th or 7th most commonly used plastic material, for instance the most commonly used plastic in cars).

In addition to the above plastics, there are special purpose plastics, including those listed below:

Maleimide/Bismaleimide: Used in high temperature composite materials.
Melamine formaldehyde (MF): One of the aminoplasts, and used as a multi-colorable alternative to phenolics, for instance in moldings (e.g., break-resistance alternatives to ceramic cups, plates and bowls for children) and the decorated top surface layer of the paper laminates (e.g., Formica).
Plastarch material: Biodegradable and heat resistant, thermoplastic composed of modified corn starch.
Phenolics (PF) or (phenol formaldehydes): High modulus, relatively heat resistant, and excellent fire resistant polymer. Used for insulating parts in electrical fixtures, paper laminated products (e.g., Formica), thermally insulation foams. It is a thermosetting plastic, with the familiar trade name Bakelite, that can be molded by heat and pressure when mixed with a filler-like wood flour or can be cast in its unfilled liquid form or cast as foam (e.g., Oasis). Problems include the probability of moldings naturally being dark colors (red, green, brown), and as thermoset it is difficult to recycle.
Polyepoxide (Epoxy): Used as an adhesive, potting agent for electrical components, and matrix for composite materials with hardeners including amine, amide, and Boron Trifluoride.
Polyetheretherketone (PEEK): Strong, chemical- and heat-resistant thermoplastic, biocompatibility allows for use in medical applications, aerospace moldings. One of the most expensive commercial polymers.
Polyetherimide (PEI) (Ultem): A high temperature, chemically stable polymer that does not crystallize.
Polyimide: A high temperature plastic used in materials such as Kapton tape.
Polylactic acid (PLA): A biodegradable, thermoplastic found converted into a variety of aliphatic polyesters derived from lactic acid which in turn can be made by fermentation of various agricultural products such as corn starch, once made from dairy products.

Polymethyl methacrylate (PMMA): Contact lenses (of the original "hard" variety), glazing (best known in this form by its various trade names around the world; e.g., Perspex, Oroglas, Plexiglas), aglets, fluorescent light diffusers, rear light covers for vehicles. It forms the basis of artistic and commercial acrylic paints when suspended in water with the use of other agents.

Polytetrafluoroethylene (PTFE): Heat-resistant, low-friction coatings, used in things like non-stick surfaces for frying pans, plumber's tape and water slides. It is more commonly known as Teflon.

Urea-formaldehyde (UF): One of the aminoplasts and used as a multi-colorable alternative to phenolics. Used as a wood adhesive (for plywood, chipboard, hardboard) and electrical switch housings.

Furan: Resin based on Furfuryl Alcohol used in foundry sands and biologically derived composites.

Silicone: Heat resistant resin used mainly as a sealant but also used for high temperature cooking utensils and as a base resin for industrial paints.

Even for plastics of the same general type that share a common resin code, variations in the manufacturing process can lead to different melting points and other properties. For example, blow molding uses different additives than injection molding, even for containers made of otherwise identical resins. As another example, bottles are made from different plastics than their attached bottle caps, requiring the bottle caps to be separated and sorted from the bottles prior to recycling. Different dyes and other additives to the plastics also can create issues for recycling Sorting of plastic can be labor and energy intensive. When sorting is performed by hand, even a skilled sorter can have difficulty identifying the particular plastic of a product. For example, many plastic products lack any sort of label indicating their plastic content/resins. Moreover, even where products share the same resins, the composition may vary due to dyes and the specific manufacturing processes (e.g., injection molding, press molding, etc.) involved. Automated sorting system can be highly accurate, but often require complicated and expensive equipment and energy consumption.

While numerous technologies exist to recycle plastic, the difficulties of recycling plastic keep the overall recycling rates low. Even in more developed countries, most disposed plastic currently is not recycled, and instead goes to landfill and incinerators. In less developed areas there is may be a lack of infrastructure and facilities for effective plastic recycling using conventional methods. The problems of plastic recycling can be particularly acute in less developed and/or remote areas, many of which may not produce or consume large amounts of plastic but may still receive large amounts of introduced plastic debris (such as marine plastic debris that may float ashore on local beaches).

What has been needed is an inexpensive and efficient method for recycling plastic using relatively simple facilities. The present invention meets this need.

SUMMARY OF THE INVENTION

The invention is a method for making an improved filler from used/recycled plastic, and for making sporting equipment and other devices made from the improved filler, and the devices made therefrom.

Methods according to the invention include the production of filler for consumer products. The filler is created by recycling discarded plastic items. In one embodiment, discarded/unwanted plastic items are gathered, which may be done by local residents on an incentive-based basis, such as by paying locals to gather plastic debris and other unwanted plastic items and bring it to a collection point for reimbursement (which may include financial compensation, such as payment by the pound of debris and/or by the volume of debris). The collection point may be at the recycling facility itself, or may be remote from the recycling facility. The remote collection point may be a storefront in a local community, which may include a community educational learning center with information on recycling and the environment. The learning center can also be a tourist destination where visitors can learn about the local environment, including the wildlife, as well as the plastic debris and recycling programs. The storefront may include videos, books, and exhibits (such as hands-on learning exhibits) that emphasize the effects of pollution on the local environment and community as well as the entire world, and also emphasize caretaking skills for better stewardship of the local and worldwide environments (including the recycling according to the current invention). The storefront include a retail store/section which sells products ultimately manufactured from the plastic collected by the locals and recycled according to the invention. If the collection point is remote from the main recycling center, the collected plastics are brought from the collection point (or collection points where multiple collection points feed a central recycling center) to the recycling facility. Instead of sorting the plastic items by type and color, etc., as is usual for conventional recycling methods, in the current method the only sorting that might occur is the optional separation of relatively large lightweight (i.e., foam) plastic items (e.g., Styrofoam coolers) from the harder/denser plastic items (e.g., plastic bottles). Note that this separation may be done at the recycling center, at the collection center(s), or by the persons who gather the plastic (dense/hard and light/foam) debris. For example, the collection center(s) may require that the persons who gather the plastic will separate the foam from the dense/heavy plastics, and/or may reimburse the gathering persons for the heavy plastics at a different rate than for the foam plastics.

After collection and (optional) sorting, the harder/denser plastic items are washed and dried, then placed into a shredder or similar mechanism/apparatus to be shredded into particles having desired sizes (e.g., maximum dimension of 1 inch, ¾ inch, ½ inch, ¼ inch, and/or ⅛ inch). The shredded plastic particles are then subjected to a second washing/drying cycle, after which the shredded particles are ready for use as shredded plastic filler in items such as new consumer products. The shredded plastic filler particles can be packaged and then transported to a manufacturing facility, or used at a manufacturing facility co-located with the recycling facility. The shredded plastic filler may include plastic particles of different plastic types (i.e., formed from many different types of plastic). For example, a package of plastic filler according to an embodiment of the invention may include polyethylene particles, polyvinyl chloride (PVC) particles, polypropylene particles, etc., all mixed together. Filler according to the invention may comprise substantive amounts (i.e., 5% or more by weight or volume) of two, three, four, five, or more of the following types of plastic particles, in any combination: polyester (PES) particles; polyethylene (PE) particles; polyethylene terephthalate (PET) particles; high-density polyethylene (HDPE) particles; low-density polyethylene (LDPE) particles; polyvinyl chloride (PVC) particles, polyvinylidene chloride (PVDC) particles; polypropylene particles; polystyrene particles; high-impact polystyrene particles; polyamides (aka nylon) particles; acrylonitrile butadiene styrene (ABS) particles;

polycarbonate particles; polycarbonate/acrylonitrile butadiene styrene (PC/ABS) particles; polyurethanes particles; maleimide/bismaleimide particles; melamine formaldehyde particles; plastarch particles; phenolics particles; polyepoxide particles; polyetheretherketone; polyetherimide particles; polyimide particles; polylactic acid particles; polymethyl methacrylate particles; polytetrafluoroethylene particles; urea-formaldehyde particles; furan particles; silicone particles.

The separated foam items (e.g., polystyrene foam, polyurethane foam) can also be washed/dried and then shredded into particles having desired sizes, such as maximum dimensions of 1 inch, ¾ inch, ½ inch, ¼ inch, and/or ⅛ inch. The shredded foam particles may then be washed/dried, and are then ready for use as shredded foam filler. The shredded foam filler particles can be packaged and then transported to a manufacturing facility, or used at a manufacturing facility co-located with the recycling facility. The shredded foam filler may include two or more different types of foam particles, such as polystyrene foam particles and polyurethane foam particles, mixed together. The shredder foam filler may occupy 5% or more of the volume of the total filler added to a final consumer product according any embodiment of the invention.

A method according to the invention of filling a device such as consumer article having an interior volume includes adding shredded plastic filler to the interior of the consumer article, with the shredded plastic filler added until a desired weight of plastic filler has been added. The remaining interior volume (or a selected portion thereof) can be filled with foam filler particles, such as recycled shredded foam filler particles. The foam filler may be added to the device after the shredded plastic filler is added to the device. The device can then be shaken or rotated or otherwise agitated in order to mix the shredded plastic filler particles with the foam filler articles. The plastic filler particles may have a maximum dimension which is the same as the maximum dimension of the foam filler particles. The foam filler particles may occupy at least 5% of the interior volume of the device. The device may have an outer cover and an inner liner, and adding recycled plastic filler particles into the device may involve adding recycled plastic filler particles into the inner liner. The inner liner can then be placed into the outer cover, or the inner liner may have been placed inside the outer cover prior to the addition of the filler.

A device according the invention includes an outer cover, with filler positioned within the outer cover. The filler is formed from a mix of shredded recycled plastic material, including different articles and plastic types and colors such as shredded plastic bottles, shredded bottle caps, shredded six-pack rings, shredded toys, shredded fishing gear, and/or shredded portions of other plastic products. The shredded recycled plastic material may have maximum dimensions of 1 inch, ¾ inch, ½ inch, ¼ inch, and/or ⅛ inch. The filler may also include foam particles, which may include shredded recycled foam particles (e.g., shredded ice chests), and which may have maximum dimensions of 1 inch, ¾ inch, ½ inch, ¼ inch, and/or ⅛ inch. The device may include an inner filler liner into which the filler is placed, with the inner filler liner inside the outer cover. The filler liner may be formed from cloth having a sufficiently tight weave to prevent the passage of dust therethrough.

Examples of devices according to the invention include an exercise bag, comprising multiple barrels (e.g., 3 barrels) stacked inside an outer exercise bag. Each barrel has a volume and a weight, and is filled with a mix of foam particles and recycled shredded plastic particles. The barrels may have identical (or almost identical, such as within 10%) weights and/or sizes/volumes, or may have different weights, or may have different sizes/volumes. In one embodiment, an exercise bag weighs between 45 and 50 pounds and includes three stacked barrels which are each cylindrical and have the same size/volume, with the bottom barrel weighing 20 pounds, the middle barrel weighing about 15 pounds, and the top barrel weighing about 10 pounds. The first barrel weight and second barrel weight and third barrel weight in combination may total between 30 and 60 pounds, or between 42 and 48 pounds. The first barrel weight may be between 5 and 15 pounds, the second barrel weight may be between 10 and 20 pounds, and the third barrel weight may be between 15 and 25 pounds. The first barrel weight may be between 9 and 11 pounds, the second barrel weight may be between 14 and 16 pounds, and the third barrel weight may be between 19 and 21 pounds.

Other examples of devices include weight barrels, medicine bags, heavy bags, barrel rolls (for use as lumbar rollers and/or therapy bolsters), multipurpose cushions, floating boat cushions, folding sports seats, sport racks, float collars, hand weights (such as barrel hand weights), pet beds, and dog toys.

BRIEF DESCRIPTION OF THE DRAWINGS

FIG. 1 depicts schematic views of prior art methods of manufacturing filler from recycled plastic according to the art;

FIG. 2 depicts schematic views of methods of manufacturing filler from recycled plastic according to an embodiment of the invention;

FIG. 6 depicts a perspective view of a multipurpose cushion according to an embodiment of the invention;

FIG. 7 depicts a perspective view of a floating cushion according to an embodiment of the invention;

FIG. 8 depicts a perspective view of a folding seat according to an embodiment of the invention;

FIGS. 9A-9C depict perspective, cross-sectional, and cross-sectional views of a sport rack component according to an embodiment of the invention;

FIGS. 9D-9F depict perspective, perspective, and side views of a sport rack according to an embodiment of the invention;

DETAILED DESCRIPTION OF PREFERRED EMBODIMENTS

Figure 3A:
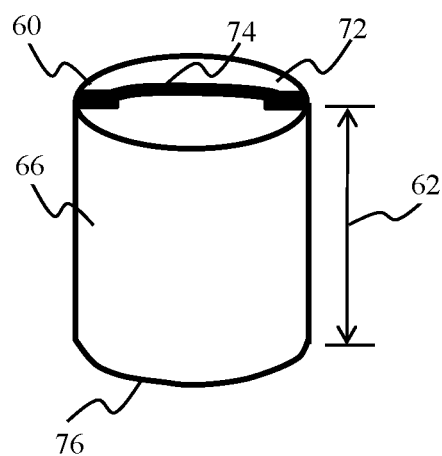
FIGS. 3A-3C depict perspective, top, and front (cross-sectional) views of a medicine barrel according to an embodiment of the invention.

Most previous plastic recycling methods require complicated sorting of the collected plastic by type, in addition to other processes required to render the recycled plastic useful for re-use. FIG. 1 depicts one such method 10, where plastic is collected 12, sorted 14 by type of plastic, and then subjected to various recycling processes 16a, 16b, 16n. Each recycling process 16a, 16b, 16n is specific to the particular plastic type being subjected to the process, and each recycling process 16a, 16b, 16n may have to be performed at a particular and separate facility. In general, the recycling process includes washing/drying 18, shredding 20, and additional processes 22 (such as melting, mixing, etc.).

Sorting of the plastic is typically among the most costly and complicated parts of the recycling process. Automated sorting often requires complicated and expensive equipment, while sorting by hand is costly in terms of personnel hours Eliminating or at least streamlining the sorting process can greatly enhance the effectiveness and efficiency of the recycling process.

In a recycling method 30 of the current invention depicted in FIG. 2, the plastic is collected 32. Plastic items that may be collected (and which commonly appear as debris on world beaches and other places) include: straws, toothbrushes, sandals and other footwear, water bottles, shampoo bottles, detergent bottles, other plastic bottles, food jars (e.g., peanut butter jars), buckets, plastic bags, soda can holders (e.g., plastic 6-pack rings), plant buckets/pots, PCV pipe, outdoor furniture, polystyrene food/drink containers, fishing line, fishing nets, plastic syringes. For the current invention, the only sorting performed on the collected plastic items (other than possible removal of non-plastic items) is separating 34 the low-density "foam" plastic materials (e.g., Styrofoam, etc.) from the denser plastics—and even this relatively simple sorting step may not be necessary where the plastics collected do not include large amounts of low-density foam materials. The separation 34 of the low-density foam from the denser plastics can be achieved with other relatively simple and low-cost techniques, such as by rough hand sorting that removes only large foam pieces (such as Styrofoam ice chests and pieces thereof). Alternatively or additionally, foam pieces may be removed during later portions of the recycling process such as during washing or shredding when foam pieces often rise to the top of the plastic materials (e.g., when exposed to water and/or passing through shredding-control grates). Moreover, depending on the particular embodiment of the invention, the separation does not have to be performed anywhere near 100% accuracy.

After the (optional) separation 34 of the foam, a first washing/drying 36 of the plastic may be performed, followed by shredding 38 of the plastic into desired sizes. Desired sizes may be between ¼ inch to ½ inch particles or other sizes. Shredding 38 may be performed using conventional methods, such as using grates having openings sized to permit the plastic pieces to drop therethrough (and away from the shredding mechanism) once the pieces are sized small enough to pass through the grate openings. For example, a grate with ¼ inch opening may be used to create ground plastic particles which are about ¼ inch in their longest dimension, while a grate with ½ inch openings may be used to create plastic particles which are about ½ inch in their longest dimension. When a different sized plastic size is desired, a grate having the wrong (i.e., undesired) size of grate openings can be removed from the mechanism and replaced with a grate having the desired size of grate opening. After shredding of the plastic, a second washing/drying 42 may be performed, at which point the recycling processing 30 is complete and the resulting plastic pieces are ready for use. The shredded and cleaned plastic pieces may be packaged 44 and transported 46 to a manufacturing facility for use in manufacturing new products.

Manufacturing use 50 of the plastic particles may include adding plastic particles 52 to new articles of manufacture (such as exercise bags), with the plastic particles added to each article based on the total weight of the plastic particles added. Once the desired weight of plastic is added to the article, the remainder of volume of the article can be filled 54 as desired with foam particles, with the foam particles added based on volume (e.g., to fill the remainder of the available volume of the article). As a general rule, adding a higher ratio of plastic pieces results in heavier and firmer articles, while adding a higher ratio of foam particles results in lighter and softer articles. With sufficient foam particles, the article may have the ability to serve as a flotation device, either for play/recreational purposes and/or safety purposes. Note that the newly filled article may be shaken or spun or otherwise physically agitated in order to mix the plastic pieces and foam particles within the newly filled article.

The foam particles added at step 54 may be provided by grinding up the foam materials that were separated from the plastic at step 34 of the plastic recycling process 30, and/or may be provided from a separate source, such as where recycled foam is provided from a separate recycling process/facility or newly manufactured foam is provided.

As an alternative method of manufacturing filler according to the invention, the plastic pieces and foam particles may be mixed prior to filling the newly manufactured articles, with the plastic pieces and foam mixed at a ratio calculated to provide a filler mix with a desired density.

Figure 3B:
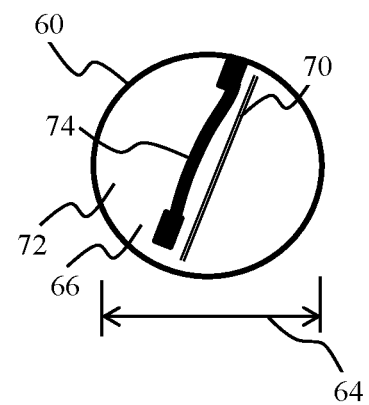
Figure 3C:
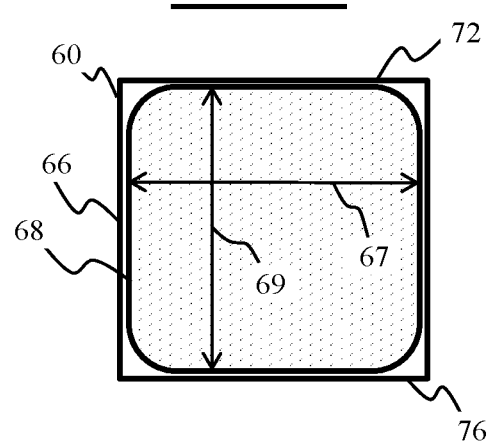

FIGS. 3A-3C depict a medicine barrel 60 having a height 62 of 12 inches (or +/−5 inches thereof) and a diameter 64 of 12 inches (or +/−5 inches thereof), although other dimensions are also within the scope of the invention. Note that a medicine barrel according to the invention may preferably have a height substantially the same as the diameter, e.g., no more than 10% difference between height and diameter. The medicine barrel 60 includes an outer cover 66, which may be formed from a suitable material such as 18 ounce polyvinyl. The outer cover 66 may be configured to contain a liner bag 68, which may be generally dimensioned as a cylinder with height and diameter the same as or just smaller than the outer cover 66 in order to fit snugly within the outer cover 66. The liner bag 68 may be formed from a suitable material, such as a fabric material having sufficiently tight weave/mesh pattern to prevent any smaller particles (such as dust particles) within the filler material from passing therethrough, yet still allowing air and water to easily pass therethrough. Examples of inner bag materials include a 100% hypoallergenic polyester cloth or 100% cotton cloth or mixed poly/cotton materials, which may be sealed completely via stitching to prevent plastic material escape. The fabric of the inner bag may be formed entirely or partially from recycled materials, such as fabric formed from recycled plastic bottles. In one embodiment, the liner bag 68 may be cylindrical and may have a diameter 67 of between 4 and 42 inches and a height 69 of 6 to 40 inches. [RBC—add more limited dimension ranges] The outer cover 66 may have a zippered opening 70 (which could alternatively be closable via Velcro or other known devices/methods) at a desired location, such as at the top 72, and may include straps 74 at the top 72 and/or bottom 76 and/or sides. Medicine barrels 60 may be used for weight training, and/or hung as a punching/kicking bag using a ring or hook or clip secured to a chain or rope secured to an overhead support. Medicine barrels 60 according to the invention may have different weights, and may be provided in sets. For example, in one embodiment medicine barrels are provided in sets of three, with a first medicine barrel weighing 10 lbs. (+/−2 lbs.), a second medicine barrel weighing 15 lbs. (+/−3 lbs.), and a third medicine barrel weighs 20 lbs. (+/−4 lbs.). To form a medicine barrel of a desired weight (such as 10 lbs.), shredded recycled plastic weighing about the same as the desired weight (e.g., 10 lbs.) is added to the inner liner bag, and then foam (which has very little weight) is added to the inner liner bag to fill the liner bag to the desired overall volume.

FIGS. 4A-4D depict a heavy bag 80 having a diameter 82 and a height 84. The heavy bag 80 has an opening (which may be closed with a zipper 85 or other closure device, or may be open) at the top 86, with straps 88 extending from the top and secured to a ring 90 (and/or clip 91) with which the heavy bag 80 may be hung from an overhead support 93 such as a ceiling or beam (e.g., using a rope and/or chain 95 and/or clip 91). The heavy bag 80 may have an internal diameter sufficient to receive weighted bags therein, such as the medicine barrels depicted in FIGS. 3A-3E. The heavy bag 80 may have a height sufficient to receive one or more medicine barrels. For example, in one embodiment depicted in FIG. 4C, the heavy bag 80 is configured to receive three medicine barrels 92a-92c therein, in stacked relationship. In one such embodiment, a heavier medicine barrel 92a (e.g., a 20 lb. medicine barrel) is at the bottom of the heavy bag, a mid-weight medicine barrel 92b (e.g., a 15 lb. medicine barrel) is at the middle of the heavy bag, and a lighter medicine barrel 92c (e.g., a 10 lb. medicine barrel) is at the top of the heavy bag 60, with the entire heavy bag 60 weighing 49 pounds (+/−7 lbs.). All three medicine barrels 92a-92c may have identical weights and/or heights, or may have differing weights and/or heights between different medicine barrels along the height of the heavy bag. In another embodiment depicted in FIG. 4D, the heavy bag 80 is configured to receive four medicine barrels 94a-94d in stacked relationship, with the two lower medicine barrels 94a, 94b each weighing about 30 pounds and the two upper medicine barrels 94c, 94d each weighing about 20 pounds so that the entire heavy bag weighs just over 100 pounds (e.g., between 100 and 110 pounds). All four medicine barrels 94a-92d may have identical weights and/or heights, or may have differing weights and/or heights between different medicine barrels along the height of the heavy bag. Note that other weights and configurations of heavy bags and medicine barrels are also within the scope of the invention.

Figure 4A:
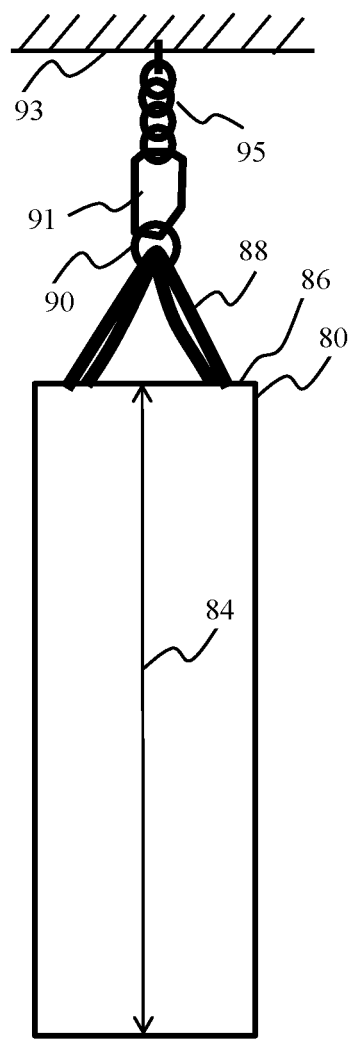
FIGS. 4A-4E depict side, top, side (cross section), side (cross section), and side (cross section) views of heavy bags according to embodiments of the invention.
Figure 4B:
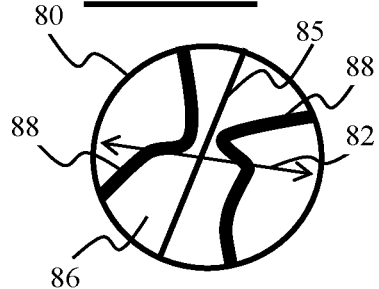
Figure 4C:
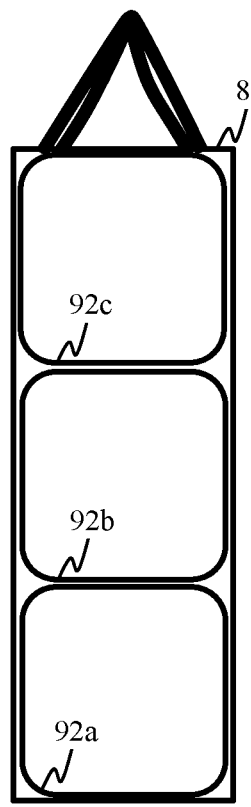
Figure 4D:
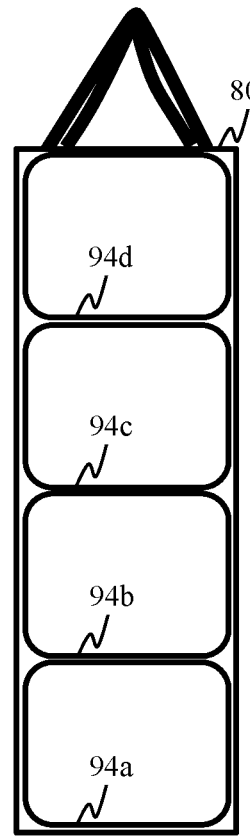
Figure 4E:
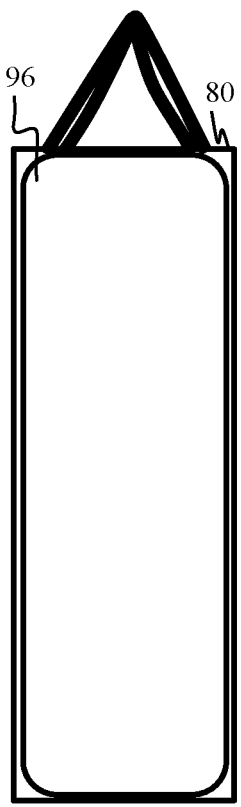

As depicted in FIG. 4E, a heavy bag 80 may be formed with a single large cylindrical bag 96 therein instead of the multiple medicine bags depicted in FIGS. 4C-4D. In all embodiments (i.e., single internal bag or multiple stacked medicine barrels), heavy bags 80 according to the invention may have different overall weights, depending on the particular application. For example, heavy bags may weigh between 20 lbs. and 120 lbs., between 45 lbs. and 100 lbs., between 40 and 50 lbs., between 90 and 110 lbs., etc.

Figure 5A:
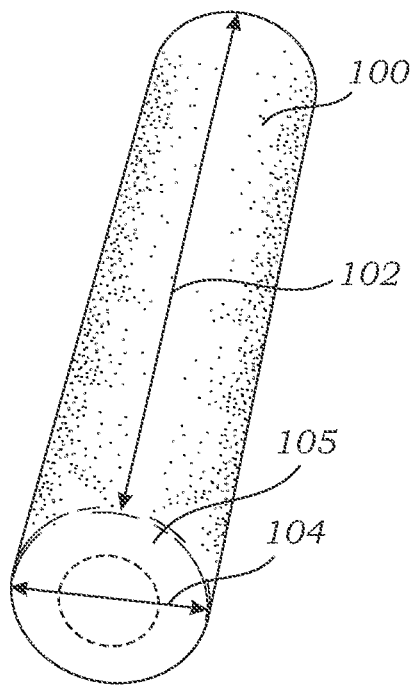
FIGS. 5A-5B depict perspective views of a barrel roll according to an embodiment of the invention.
Figure 5B:
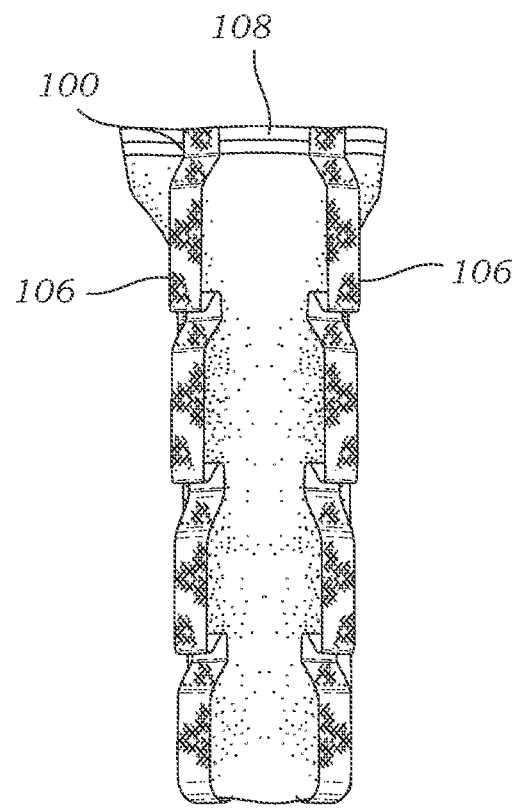

A barrel roll 100 such as that depicted in FIGS. 5A and 5B may serve as a lumbar roller, therapy bolster, or be used for other purposes. Such a barrel roll 100 may be substantially cylindrical and have a length 102 of 24 inches (+/−12 inches) and a diameter 104 of 6 inches (or between 2 inches and 12 inches) and overall weight of 6 to 12 pounds. For such a barrel roll having a length of 24 inches and radius of 6 inches, 8 to 10 pounds of plastic particles may be added as filler in the barrel roll, with sufficient foam particles added to fill the remaining volume. The barrel roll 100 may have handles 106 along the sides thereof, and/or may include handles at either end. The barrel roll 100 may have a substantially cylindrical form with circular ends 105 as in FIG. 5A, or may have a simple flat seamed end 108 as depicted in FIG. 5B.

FIG. 6 depicts a multipurpose cushion 110 which can serve as a fitness pad, chaise lounge cushion, etc., as well as two smaller floating cushions 120. The multipurpose cushion has a length 112 of 6 to 8 feet (e.g., 72 to 84 inches), a width 114 of 2 to 4 feet (e.g., 22 to 36 inches), and a thickness 116 of 2 to 6 inches (e.g., 3 inches). Note that other dimensions are also within the scope of the invention. The cushion 110 may have an outer cover 118 that may be filled with a desired amount (e.g., 8 to 16 pounds, 10 to 14 pounds, 12 pounds, etc.) of plastic particles, with the remainder of the volume filled with foam particles.

FIG. 7 depicts a floating cushion 120 that can be used as a comfortable all-weather seat cushion and as a flotation device. The floating cushion 120 has a length 122 of 12 to 18 inches (e.g., 14 inches), a width 124 of 12 to 18 inches (e.g., 14 inches), and a thickness 126 of 2 to 6 inches (e.g., 3 inches). The cushion may preferably have a length that is substantially the same as the width, e.g., a length within 10% of the width. Note that other dimensions are also within the scope of the invention. The cushion 120 has an outer cover 128 which may be waterproof or may permit water to easily pass therethrough (but preferably dries quickly). The cushion 120 if 14 inches by 14 inches by 3 inches may be filled with 5 pounds of plastic particles and 196 cubic inches of foam particles (depending on the particular size and configuration). Note that the floating cushion may also be made in a non-floating embodiment.

FIG. 8 depicts a folding seat 130 which has a seat portion 132 and a back portion 134 connected at a fold 136 and side straps 138. The folding seat 130 has a width 140 of 12 to 18 inches (e.g., 16 inches), with the seat portion 132 having a length 142 of 12 to 18 inches (e.g., 16 inches) and the back portion 134 having a length 144 of 12 to 18 inches (e.g., 16 inches). The seat portion 132 and back portion 134 have a thickness 146 of ½ to 2 inches, and can be filled with 3 to 7 pounds of plastic pieces, with the remainder of the volume (e.g., 1350 to 1625 cubic inches) filled with foam particles.

A sport rack 150 as depicted in FIGS. 9A-9D is composed of two flexible tie-down components 151 that can be tied to the roof 152 of almost any vehicle, with or without roof gutters. The flexible components 151 can be secured to the roof 152 in front-to-back configuration. Each flexible component 151 may be formed from a single tubular section 153, which may be formed from a length (e.g., 6 feet+/−1 foot) of material such as recycled fire hose, e.g., 1.5 inch diameter (2.5 inch width flat) single jacket used fire hose. The tubular section 153 is folded in half at a fold 154 to form a lower bolster 155 and an upper bolster 156, with the bolsters 155, 156 each having a length 157 equal to half of the overall length 158 of the tubular section 153, and each bolster 155, 156 also having a diameter 159. As depicted in FIGS. 9B-9C, each bolster 155, 156 may have a liner 160, which may be formed of an impermeable rubber-like material to hold the necessary filler material 161. Note that single jacket fire hose typically has a built-in liner in the form of a rubber or similar waterproof/impermeable material on the inside of a woven polyester (permeable) outer hose material.

A lower strap 162 passes through the lower bolster 155, exiting the lower bolster at the free end thereof and also through a slit 163 at the other end thereof (i.e., adjacent the fold 154). The lower strap 162, which may be formed from 1 to 2 inch width tubular nylon webbing, may a length (e.g., 8 feet to 10 feet) sufficient to pass over the roof 153 of the car and through the interior of the car via door openings on either side of the car, as depicted in FIG. 9D, thus forming a continuous loop passing over the roof and through the car interior. The loop can be tightened and secured to itself via connections such as stainless steel ring buckles 163 (e.g., 1" to 2" inch stainless steel ring buckles). The lower strap 162 may be fed through the rings 163 in a serpentine fashion and secured back upon itself, such as via using hook and loop Velcro sewn to an exposed portion of the lower strap 162. Alternatively, the lower strap 162 may have a shorter length but connecting elements at either end configured to be secured to the car via other methods, such as by having thick pad-like portions at either end that, when positioned inside the car with the car doors shut, are too thick to be slid out of the seam between the upper portion of the car door and the lower edge of the car roof. Other methods include having clamps or other locks at the ends of the lower strap, with the clamps or other locks configured to be secured to the car at the roof edges or upper door portions.

An upper strap 164 extends through the full length of the tubular section 153, i.e., through both the lower bolster 155 and the upper bolster 156, and extends for about 2 feet beyond either end of the tubular section 153. The upper strap 164 may be utilized in securing the top bolster 156 back down upon the bottom bolster 155 using connectors, such as stainless steel rings 165 like those used to secure the component 151 to the vehicle roof 153. The upper strap 164 thus serves to hold the top bolster 156 firmly down on the bottom bolster 157, thus sandwiching selected sporting items such as surf boards or snow boards in between the top and bottom bolsters 155, 156, as depicted in FIG. 9E.

The ends of the bolsters 155, 156 may be sealed via glue (e.g., rubber glue) and/or stitching. The liners 160 may be formed from woven material such as polyester and/or cotton materials having sufficiently tight weaves to prevent the filler 161 therein form leaking out. Each bolster 156, 158 may have filler 161 of 2 to 6 pounds (e.g., 4 pounds) of plastic particles, with about ¼ to 2 cubic feet (e.g., ½ cubic feet) of foam particles added to fill the remainder of the volume of the bolsters.

The sport rack 150 may include a cover 168 sized and configured to receive the two (i.e., front and back) tie-down components 151, as depicted in FIG. 9F. The cover/holder may have dimensions sufficient to hold the two tie-down components, such as 6 to 12 inch diameter (e.g., 8 inch diameter) and 3 to 4 feet length (i.e., 40 inch length).

Figure 10:
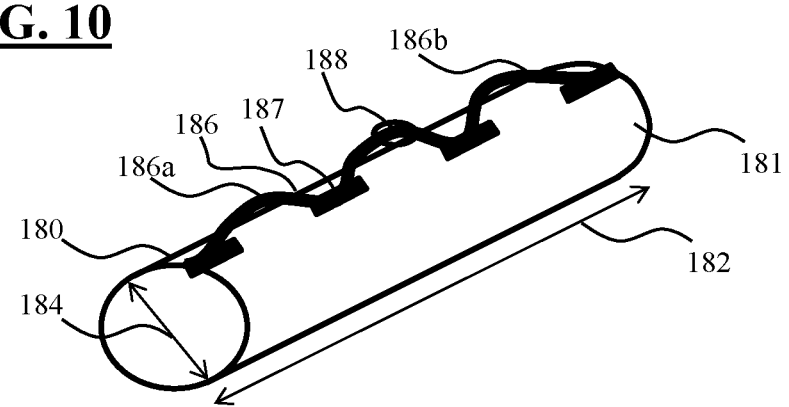
FIG. 10 depicts a perspective view of a float collar according to an embodiment of the invention.

A float collar 180 is depicted in FIG. 10 having an outer cover 181, a length 182 of 3 feet, and a diameter 184 of 6 inches. A strap 186 extends from either end, which pass through loops 187 or other connectors along the length of the float collar. The strap 186 may have two sections 186a, 186b secured via a buckle 188, which can be disconnected and reconnected together to be removed from the loops (e.g., to be secured around a user). The float collar 180 can be filled with 2 pounds of shredded plastic filler, with the remainder of the volume filled with foam (such as 4060 cubic inches (e.g., 2.35 cubic feet) of foam filler). The cover may be formed of polyvinyl material that is permeable at the seams but not through the material itself.

Figure 11:
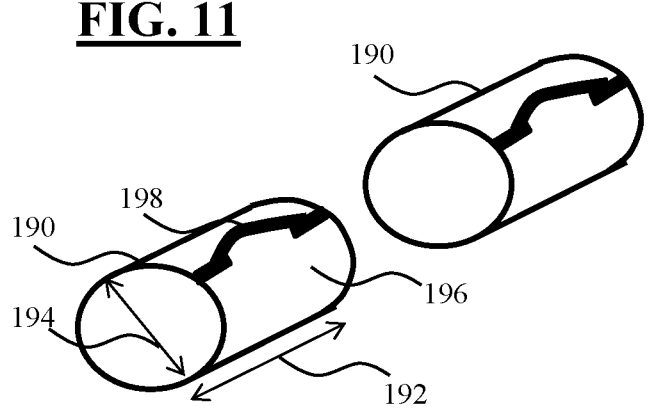
FIG. 11 depicts a perspective view of a barrel weight according to an embodiment of the invention.

Another embodiment of the invention involves barrel hand weights, which may be provided in pairs, such as pairs of 2 lb., 4 lb., and 6 lb. barrel weights, which have the desired weight but may also be able to float and be used for water-based exercises. FIG. 11 depicts such barrel hand weights 190, with each barrel hand weight 190 having a length 192 of 12 inches and a diameter 194 of 6 inches. Note that other dimensions are also within the scope of the invention, such as 8 to 16 inches length and 4 to 10 inches diameter. Each barrel weight 190 has an outer cover 196 and includes a strap 198 on the side thereof. The outer covering may be formed of various available materials, such as waterproof 18 ounce polyvinyl tarp material. Shredded recycled plastic is added by weight as filler to each barrel hand weight 190, with the remaining volume of each barrel hand weight filled with foam.

Figure 12:
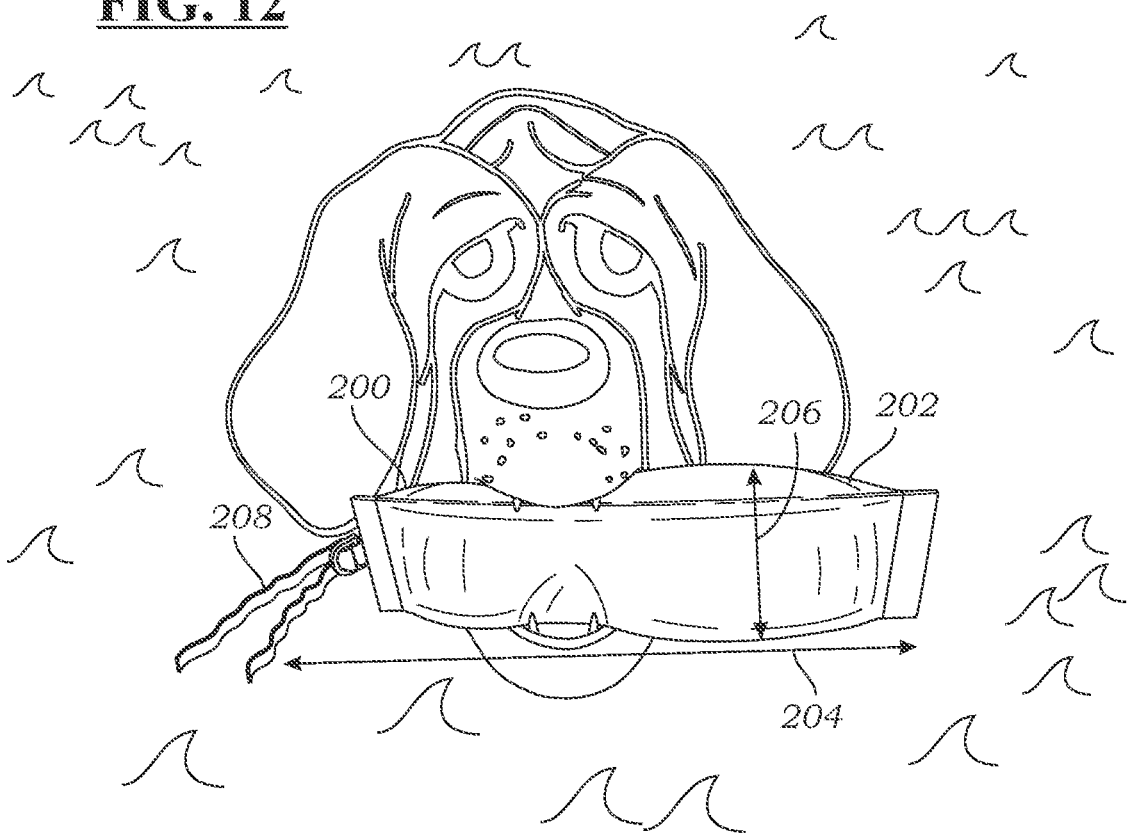
FIG. 12 depicts a perspective view of a dog chew toy according to an embodiment of the invention.

FIG. 12 depicts a dog chew toy 200 having an outer cover 202, a length 204, a diameter 206, and a strap 208. The dog chew 200 toy may be formed from used fire hoses, which are cut to the desired length and then closed at either end (e.g., via sewing, zipper, and/or other known methods) to enclose the filler therein. In one embodiment, the dog chew toy 200 has a length 204 of 8 to 24 inches (e.g., 12 inches) and a diameter 206 of 2 to 6 inches (e.g., 4 inches. The dog chew toy 200 can be filled with about 2 pounds of shredded recycled plastic, and may be configured to float in water.

Figure 13:
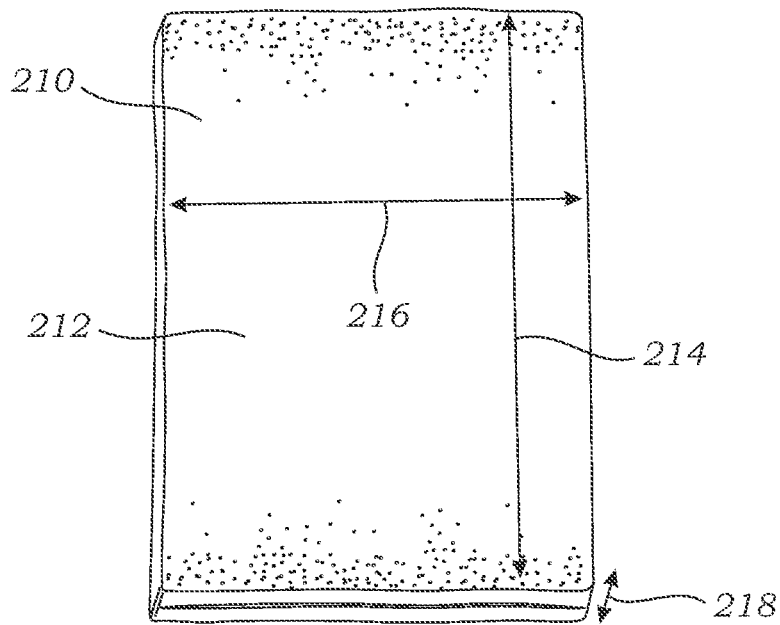
FIG. 13 depicts a perspective view of a pet bed according to an embodiment of the invention.

FIG. 13 depicts a pet bed 210 having an outer cover 212, a length 214, a width 216, and a thickness 218. The outer cover 212 may be constructed from heavy canvas, and may include a non-skid layer on the lower side thereof. In one embodiment, the length 214 is 36 inches, the width 216 is 24 inches, and the thickness is 3 to 6 inches. The pet bed 210 can be filled entirely with foam, such as Styrofoam (either recycled or newly-manufactured), or may have some shredded recycled plastic added for added firmness.

Figure 14:
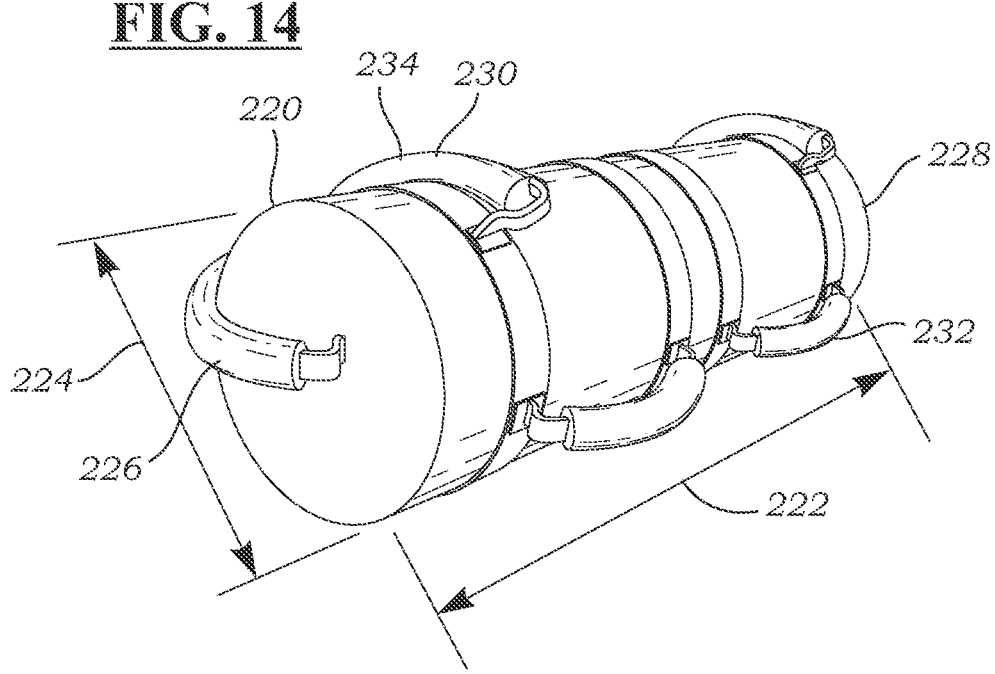
FIG. 14 depicts a perspective view of a barrel bag according to an embodiment of the invention.

FIG. 14 depicts a weighted barrel bag 220 for use in exercises, including weight training, swimming, etc. The weighted barrel bag 220 may come in different weights and sizes. As depicted, the barrel bag 220 has a length 222 and a width/diameter 224. End straps 226 may be provided at one or both ends 228 of the bag 220. Radial straps 230 may be provided which pass at least partially and radially around the bag 220, and/or length-wise straps 232 which pass at least partially lengthwise along the bag 220. The straps may be sized to be grasped by a human hand. For example, the straps may have lengths between 5 and 10 inches, or between 6 and 9 inches. Straps may be provided with padding 234 for easier grasping. The weight of each bag is determined by the density of the filler material. As discussed previously with respect to other embodiments of the invention, a heavier bag can be achieved by filling the bag during manufacture with heavier/denser plastic filler. For lighter bags, lighter plastic/foam filler can be used. By appropriate mixing of heavier and lighter filler materials, the desired weight for a desired bag can be achieved. In one embodiment, a set of four (4) weighted barrel bags is provided, with each bag of the same size (e.g., length of 26 inches and diameter/width of 8 inches, although other lengths/widths are also appropriate such as lengths of between 20-32 inches or 24-28 inches, combined with diameters/widths of between 4-12 inches or 6-10 inches). Each bag in the set of bags may be of the same size (e.g., 26×8 inches), but each bag in the set may have a different weight. For example, a first bag may have a weight of 10 lbs, a second bag may have a weight of 20 lbs, a third bag may have a weight of 30 lbs, and a fourth bag may have a weight of 40 lbs. One or more of the bags in the set may be capable of floating in water.

Figure 15:
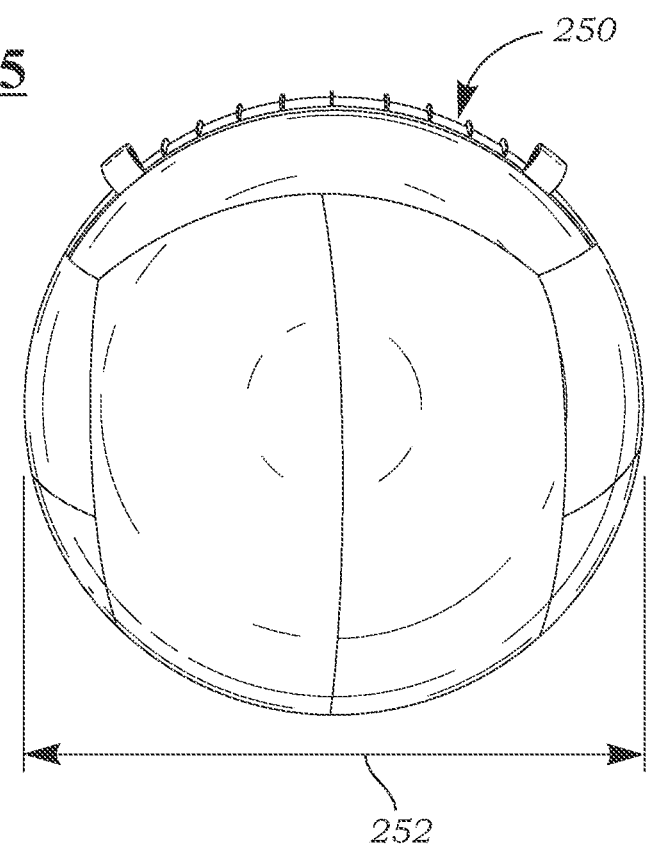
FIG. 15 depicts a side view of a weight medicine ball according to an embodiment of the invention.

FIG. 15 depicts a medicine weight ball 250 according to an embodiment of the invention. The medicine ball 250 may have a diameter 252 of between 10 and 18 inches, between 12 and 16 inches, between 13 and 15 inches, or 14 inches. The medicine ball 250 may weigh between 2 and 30 pounds or more. Exemplary weights are 2, 4, 6, 8, 120, 12, 15, 20, 25, 30 lbs, although other weights and weight ranges are also within the scope of the invention, such as weights between 2-4, 4-6, 6-8, 8-10, 10-12, 12-15, 15-20, 20-25, 25-30, 2-30, 5-20, and 5-15 lbs.

Although the invention has been described in terms of particular embodiments and applications, one of ordinary skill in the art, in light of this teaching, can generate additional embodiments and modifications without departing from the spirit of or exceeding the scope of the claimed invention. For example, although the above devices and methods are described for use in a particular manner, the devices and methods described herein could be used in a variety of different methods of use. As a further example, it will be recognized that the embodiments described above and aspects thereof may be modified to adapt a particular situation or device to the teachings of the invention without departing from the essential scope thereof. Accordingly, it is to be understood that the drawings and descriptions of specific embodiments herein are proffered by way of example to facilitate comprehension of the invention, and should not be construed to limit the scope thereof.

What is claimed is:

1. A medicine ball, comprising:
    an outer cover;
    a filler liner positioned within the outer cover, wherein the filler liner comprises a woven material having sufficiently small mesh pattern to prevent passage of dust therethrough; and
    a shredded filler positioned within and substantially filling the filler liner such that the filler liner substantially fills the outer cover, the shredded filler comprising shredded plastic particles comprising shredded portions of recycled plastic products, wherein the recycled plastic products comprise recycled plastic bottles and other recycled plastic products, whereby the shredded plastic particles comprise shredded portions of recycled plastic bottles and shredded portions of other recycled plastic products, wherein the shredded portions of recycled plastic bottles and the shredded portions of other recycled plastic products comprise different plastic types and different plastic colors;
    wherein the medicine ball has a diameter between 10 and 18 inches.

2. The medicine ball of claim 1, wherein the diameter is between 13 and 15 inches.

3. The medicine ball of claim 1, wherein the medicine ball weighs between 2 and 30 pounds.

4. The medicine ball of claim 3, wherein the medicine ball weighs between 20 and 25 pounds.

5. The medicine ball of claim 1, wherein the outer cover comprises polyvinyl.

6. The medicine ball of claim 1, wherein the shredded filler comprises a mixture of at least three different types of shredded plastic particles, wherein each of the at least three different types of shredded plastic particles comprises 5% or more of a total weight of the shredded filler, wherein the shredded plastic particles are from at least three of the following types of shredded plastic particles: shredded polyester (PES) particles; shredded polyethylene (PE) particles; shredded polyethylene terephthalate (PET) particles; shredded high-density polyethylene (HDPE) particles; shredded low-density polyethylene (LDPE) particles; shredded polyvinyl chloride (PVC) particles; shredded polyvinylidene chloride (PVDC) particles; shredded polypropylene particles; shredded polystyrene particles; shredded high-impact polystyrene particles; shredded polyamides (aka nylon) particles; shredded acrylonitrile butadiene styrene (ABS) particles; shredded polycarbonate particles; shredded polycarbonate/acrylonitrile butadiene styrene (PC/ABS) particles; shredded polyurethanes particles; shredded maleimide/bis-maleimide particles; shredded melamine formaldehyde particles; shredded plastarch particles; shredded phenolics particles; shredded polyepoxide particles; shredded polyetheretherketone particles; shredded polyetherimide particles; shredded polyimide particles; shredded polylactic acid particles; shredded polymethyl methacrylate particles; shredded polytetrafluoroethylene particles; shredded urea-formaldehyde particles; shredded furan particles; shredded silicone particles.

7. The medicine ball of claim 1, wherein the shredded plastic particles primarily comprise plastic pieces having a plastic maximum dimension, wherein the plastic maximum dimension is one of the following: 1 to ¾ inch; ¾ to ½ inch; ½ to ¼ inch; or ¼ inch or less, and the shredded filler further comprises:
    foam pieces having a foam maximum dimension selected from the following: 1 to ¾ inch; ¾ to ½ inch; ½ to ¼ inch; or ¼ inch or less.

8. The medicine ball of claim 7, wherein the shredded filler comprises an overall volume, and wherein the foam pieces occupy at least 5% of the overall volume.

9. A medicine ball, comprising:
    an outer cover; and
    a bag filler positioned within the outer cover, the bag filler comprising a mix of shredded plastic particles and foam pieces, wherein the shredded plastic particles comprise shredded portions of recycled plastic products, wherein the recycled plastic products comprise recycled plastic bottles and other recycled plastic products, whereby the shredded plastic particles comprise shredded portions of the recycled plastic bottles and shredded portions of other recycled plastic products, wherein the shredded portions of the recycled plastic bottles and the shredded portions of other recycled plastic products comprise different plastic types and different plastic colors;
    wherein the medicine ball has an overall diameter of between 10 and 18 inches and a weight between 20 and 25 pounds.

10. The medicine ball of claim 9, wherein the shredded plastic particles primarily comprise plastic pieces having a plastic maximum dimension, wherein the plastic maximum dimension is one of the following: 1 to ¾ inch; ¾ to ½ inch; ½ to ¼ inch; or ¼ inch or less; and
    wherein the foam pieces having a foam maximum dimension selected from the following: 1 to ¾ inch; ¾ to ½ inch; ½ to ¼ inch; or ¼ inch or less.

11. The medicine ball of claim 10, wherein the bag filler comprises a mixture of at least three different types of shredded plastic particles, wherein each of the at least three different types of shredded plastic particles comprises 5% or more of a total weight of the bag filler, wherein the shredded plastic particles are from at least three of the following types of shredded plastic particles: shredded polyester (PES) particles; shredded polyethylene (PE) particles; shredded polyethylene terephthalate (PET) particles; shredded high-density polyethylene (HDPE) particles; shredded low-density polyethylene (LDPE) particles; shredded polyvinyl chloride (PVC) particles; shredded polyvinylidene chloride (PVDC) particles; shredded polypropylene particles; shredded polystyrene particles; shredded high-impact polystyrene particles; shredded polyamides (aka nylon) particles; shredded acrylonitrile butadiene styrene (ABS) particles; shredded polycarbonate particles; shredded polycarbonate/acrylonitrile butadiene styrene (PC/ABS) particles; shredded polyurethanes particles; shredded maleimide/bismaleimide particles; shredded melamine formaldehyde particles; shredded plastarch particles; shredded phenolics particles; shredded polyepoxide particles; shredded polyetheretherketone particles; shredded polyetherimide particles; shredded polyimide particles; shredded polylactic acid particles; shredded polymethyl methacrylate particles; shredded polytetrafluoroethylene particles; shredded urea-formaldehyde particles; shredded furan particles; shredded silicone particles.

12. The medicine ball of claim 9, wherein the shredded plastic particles were created by shredding recycled plastic articles that were not sorted by plastic type or plastic color, other than removal of low-density foam plastic materials from the recycled plastic articles.

\* \* \* \* \*